(12) United States Patent
Esman

(10) Patent No.: US 10,735,128 B1
(45) Date of Patent: Aug. 4, 2020

(54) OPTICAL PHASE SENSITIVITY ENHANCEMENT FOR REDUCED POWER

(71) Applicant: Rockwell Collins, Inc., Cedar Rapids, IA (US)

(72) Inventor: Daniel J. Esman, Columbia, MD (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/293,033

(22) Filed: Mar. 5, 2019

(51) Int. Cl.
*H04J 14/02* (2006.01)
*H04B 10/61* (2013.01)
*H04B 10/2575* (2013.01)
*H04B 10/29* (2013.01)

(52) U.S. Cl.
CPC ...... *H04J 14/0221* (2013.01); *H04B 10/2575* (2013.01); *H04B 10/612* (2013.01); *H04B 10/29* (2013.01); *H04B 2210/006* (2013.01); *H04J 14/02* (2013.01)

(58) Field of Classification Search
CPC .... H04J 14/0221; H04J 14/02; H04B 10/612; H04B 10/2575; H04B 10/29; H04B 2210/006
USPC ............... 398/43–103, 115–117, 173–181
See application file for complete search history.

(56) References Cited

U.S. PATENT DOCUMENTS

| | | | | |
|---|---|---|---|---|
| 5,432,632 A * | 7/1995 | Watanabe | ........... | H04J 14/0298 398/204 |
| 6,441,938 B1 * | 8/2002 | Heflinger | ......... | H04B 10/25751 398/152 |
| 6,459,525 B1 * | 10/2002 | Aso | ........................ | G02F 1/39 359/326 |
| 6,490,068 B1 * | 12/2002 | Heflinger | ......... | H04B 10/25751 398/188 |
| 6,850,712 B1 * | 2/2005 | Delavaux | ........... | H04B 10/2537 398/183 |
| 6,970,654 B1 * | 11/2005 | Paglione | ................ | B82Y 20/00 398/182 |
| 7,164,526 B2 * | 1/2007 | McKinstrie | ............. | G02F 1/395 330/4.5 |

(Continued)

OTHER PUBLICATIONS

Nguyen et al, All Optical 2R Regeneration of BPSK and QPSK Data using a 90 Optical Hybrid, Mar. 2011, OSA/OFC/NFOEC, OMT3, All Document. (Year: 2011).*

(Continued)

*Primary Examiner* — Dibson J Sanchez
(74) *Attorney, Agent, or Firm* — Suiter Swantz pc llo

(57) ABSTRACT

A system may include: an optical pulse source; fiber optic links; a first optical coupler optically coupled to the optical pulse source; a radiofrequency (RF) source; a phase modulator (PM) optically coupled to the first optical coupler and electronically coupled to the RF source; an interleaving delay optically coupled to the first optical coupler; a second optical coupler optically coupled to the PM and the interleaving delay; a laser; an optical amplifier optically coupled to the laser; a wavelength division multiplexer (WDM) optically coupled to the optical amplifier and the optical coupler; a highly nonlinear fiber (HNLF); an optical filter optically coupled to the WDM via the HNLF; an optical switch optically coupled to the optical filter; and a coherent detector optically coupled to the optical switch via a first optical path and a second optical path, the first optical path including an optical delay.

20 Claims, 9 Drawing Sheets

(56) References Cited

U.S. PATENT DOCUMENTS

| | | | | |
|---|---|---|---|---|
| 7,382,983 | B2* | 6/2008 | Mizuma | H01Q 3/2676 342/368 |
| 7,764,423 | B2* | 7/2010 | McKinstrie | G02F 1/395 359/326 |
| 7,877,020 | B1* | 1/2011 | Hayes | H04B 10/50 398/183 |
| 8,041,169 | B2* | 10/2011 | Watanabe | G02F 1/395 359/328 |
| 8,442,402 | B1* | 5/2013 | Zanoni | H03M 1/1245 341/137 |
| 8,548,331 | B1* | 10/2013 | Zanoni | H04B 10/90 398/115 |
| 8,761,613 | B2* | 6/2014 | Dou | H04B 10/50595 398/198 |
| 8,779,955 | B1* | 7/2014 | Zanoni | G02F 7/00 341/132 |
| 8,818,141 | B1* | 8/2014 | Hochberg | H04B 10/505 385/2 |
| 8,837,956 | B1* | 9/2014 | Zanoni | H04B 10/61 398/158 |
| 8,842,998 | B2* | 9/2014 | Delfyett | H01S 5/0656 398/188 |
| 8,879,916 | B1* | 11/2014 | Ng | H04B 10/25759 398/115 |
| 8,965,211 | B1* | 2/2015 | Zanoni | H04B 10/61 341/137 |
| 9,197,471 | B1* | 11/2015 | Zanoni | H04L 27/223 |
| 9,407,376 | B2* | 8/2016 | Lyubomirsky | H04J 14/06 |
| 9,843,398 | B1 | 12/2017 | Zanoni et al. | |
| 9,888,303 | B1* | 2/2018 | Jepsen | H04Q 11/0066 |
| 10,069,619 | B1* | 9/2018 | Zanoni | H03M 1/1245 |
| 10,404,400 | B2* | 9/2019 | Chen | H04J 14/06 |
| 2002/0159668 | A1* | 10/2002 | Williams | G02F 1/225 385/3 |
| 2005/0129412 | A1* | 6/2005 | Centanni | H04Q 11/0005 398/183 |
| 2006/0051100 | A1* | 3/2006 | Watanabe | H04J 14/08 398/152 |
| 2007/0009264 | A1* | 1/2007 | Kamio | H04B 10/505 398/102 |
| 2007/0025737 | A1* | 2/2007 | Kamio | H04B 10/677 398/150 |
| 2007/0230518 | A1* | 10/2007 | Watanabe | H04B 10/299 372/22 |
| 2008/0130097 | A1* | 6/2008 | McKinstrie | G02F 1/395 359/330 |
| 2010/0316393 | A1* | 12/2010 | Schmidt | H04B 10/61 398/205 |
| 2011/0150504 | A1* | 6/2011 | Ellis | H04B 10/50 398/183 |
| 2011/0176202 | A1* | 7/2011 | Kato | G02F 1/395 359/337.5 |
| 2012/0020665 | A1* | 1/2012 | Watanabe | G02F 1/3515 398/65 |
| 2012/0140809 | A1* | 6/2012 | Krause | H04L 1/205 375/224 |
| 2012/0315049 | A1* | 12/2012 | Banwell | H04B 10/25759 398/115 |
| 2013/0202308 | A1* | 8/2013 | Middleton | H01Q 3/2676 398/116 |
| 2013/0236187 | A1* | 9/2013 | Middleton | H04B 10/00 398/116 |
| 2013/0330070 | A1* | 12/2013 | Yu | H04B 10/2507 398/16 |
| 2014/0043674 | A1* | 2/2014 | Takasaka | H01S 3/10023 359/334 |
| 2014/0193152 | A1* | 7/2014 | Zhou | H04B 10/614 398/72 |
| 2015/0222356 | A1* | 8/2015 | Kawanishi | H04J 14/04 398/43 |
| 2015/0358086 | A1* | 12/2015 | Foster | H04B 10/5561 398/115 |
| 2016/0301475 | A1* | 10/2016 | Li | H04B 10/54 |
| 2017/0005732 | A1* | 1/2017 | Schaefer | H04B 10/503 |
| 2017/0026125 | A1* | 1/2017 | Middleton | H04B 10/25758 |
| 2017/0033870 | A1* | 2/2017 | Dangui | H04J 14/0279 |
| 2017/0163351 | A1* | 6/2017 | Puleri | G01S 7/02 |
| 2018/0180655 | A1* | 6/2018 | Kuse | G01R 29/26 |
| 2019/0229811 | A1* | 7/2019 | Gupta | H04B 10/25 |

OTHER PUBLICATIONS

Wikipedia, "Optical modulator", Retrieved from https://en.wikipedia.org/w/index/php?title=Optical_modulator&oldid=871192147, 2 pages, Printed on Dec. 19, 2018.

Wikipedia, "Photonics", Retrieved from https://en.wikipedia.org/w/index/php?title=Photonics&oldid=872462133, 7 pages, Printed on Dec. 19, 2018.

Wikipedia, "Spurious-free dynamic range", Retrieved from https://en.wikipedia.org/w/index/php?title=Spurious-free_dynamic_range&oldid=853141980, 2 pages, Printed on Dec. 19, 2018.

* cited by examiner

OPTICAL PHASE SENSITIVITY ENHANCEMENT FOR REDUCED POWER

GOVERNMENT LICENSE RIGHTS

This invention was made with government support under HR0011-13-C-0071 awarded by the Department of Defense. The government has certain rights in the invention.

BACKGROUND

In an existing phase modulated radiofrequency (RF) pulsed photonic link, the input RF signal can be sampled with a phase modulator at a remote location. Current phase modulators require significantly more RF power than an antenna can deliver on its own. An active RF amplifier is typically used to compensate for this power difference. The active RF amplifier is used at the remote location to reach a full modulation depth. It would be desirable to reduce the electrical power requirements at the remote location. It would be desirable to reduce gain so as to eliminate the need for this RF amplifier, thereby reducing size, weight and power of the system.

SUMMARY

In one aspect, embodiments of the inventive concepts disclosed herein are directed to a system. The system may include: an optical pulse source; a first fiber optic link; a first optical coupler optically coupled to the optical pulse source via the first fiber optic link; a radiofrequency (RF) source; a phase modulator (PM) optically coupled to the first optical coupler and electronically coupled to the RF source; an interleaving delay optically coupled to the first optical coupler; a second optical coupler optically coupled to the PM and the interleaving delay; a second fiber optic link; a laser; an optical amplifier optically coupled to the laser; a wavelength division multiplexer (WDM) optically coupled to the optical amplifier and the optical coupler via the second fiber optic link; a highly nonlinear fiber (HNLF); an optical filter optically coupled to the WDM via the HNLF; an optical switch optically coupled to the optical filter; and a coherent detector optically coupled to the optical switch via a first optical path and a second optical path, the first optical path including an optical delay. The optical source may be configured to output a pulse. The pulse may be transmitted, via the first fiber optic link, from the optical source to the first optical coupler. The first optical coupler may be configured to split the pulse into a signal pulse to the PM and a reference pulse to the interleaving delay. The PM may be configured to receive an RF signal from the RF source, to imprint the RF signal onto an optical phase of the signal pulse, and to output the signal pulse to the second optical coupler. The interleaving delay may be configured to impart a delay to the reference pulse. The second optical coupler may be configured to combine the signal pulse and the reference pulse to output the signal pulse and the interleaved reference pulse. The signal pulse and the interleaved reference pulse may be transmitted, via the second fiber optic link. The laser may be configured to output a laser signal to the optical amplifier. The optical amplifier may be configured to amplify the laser signal. The WDM may be configured to combine the interleaved signal and reference pulses with the laser signal and to output the combination to the HNLF. The combination of the interleaved signal and reference pulses with the laser signal may mix in the HNLF to produce an idler. The optical filter may be configured to filter out the idler. The optical switch may be configured to separate the signal pulse and reference pulse, output the signal pulse on the first optical path, and output the reference pulse on the second optical path. The signal pulse and reference pulse may be time aligned when received by the coherent detector. The coherent detector may be configured to determine the RF signal by measuring the imprinted optical phase of the signal pulse.

In a further aspect, embodiments of the inventive concepts disclosed herein are directed to an aircraft system. The aircraft system may include: an optical pulse source; a first fiber optic link; a first optical coupler optically coupled to the optical pulse source via the first fiber optic link; a radiofrequency (RF) source; a phase modulator (PM) optically coupled to the first optical coupler and electronically coupled to the RF source; an interleaving delay optically coupled to the first optical coupler; a second optical coupler optically coupled to the PM and the interleaving delay; a second fiber optic link; a laser; an optical amplifier optically coupled to the laser; a wavelength division multiplexer (WDM) optically coupled to the optical amplifier and the optical coupler via the second fiber optic link; a highly nonlinear fiber (HNLF); an optical filter optically coupled to the WDM via the HNLF; an optical switch optically coupled to the optical filter; and a coherent detector optically coupled to the optical switch via a first optical path and a second optical path, the first optical path including an optical delay. The optical source may be configured to output a pulse. The pulse may be transmitted, via the first fiber optic link, from the optical source to the first optical coupler. The first optical coupler may be configured to split the pulse into a signal pulse to the PM and a reference pulse to the interleaving delay. The PM may be configured to receive an RF signal from the RF source, to imprint the RF signal onto an optical phase of the signal pulse, and to output the signal pulse to the second optical coupler. The interleaving delay may be configured to impart a delay to the reference pulse. The second optical coupler may be configured to combine the signal pulse and the reference pulse to output the signal pulse and the interleaved reference pulse. The signal pulse and the interleaved reference pulse may be transmitted, via the second fiber optic link. The laser may be configured to output a laser signal to the optical amplifier. The optical amplifier may be configured to amplify the laser signal. The WDM may be configured to combine the interleaved signal and reference pulses with the laser signal and to output the combination to the HNLF. The combination of the interleaved signal and reference pulses with the laser signal may mix in the HNLF to produce an idler. The optical filter may be configured to filter out the idler. The optical switch may be configured to separate the signal pulse and reference pulse, output the signal pulse on the first optical path, and output the reference pulse on the second optical path. The signal pulse and reference pulse may be time aligned when received by the coherent detector. The coherent detector may be configured to determine the RF signal by measuring the imprinted optical phase of the signal pulse.

In a further aspect, embodiments of the inventive concepts disclosed herein are directed to a method. A step may include outputting, by an optical source, a pulse to a first optical coupler via a first fiber optic link. A step may include outputting, by the first optical coupler, a signal pulse to a phase modulator (PM). A step may include outputting, by the first optical coupler, a reference pulse to an interleaving delay. A step may include receiving, by the PM, a radiofrequency (RF) signal from an RF source. A step may include imprinting, by the PM, the RF signal onto an optical phase of the signal pulse. A step may include outputting, by the PM, the signal pulse to a second optical coupler. A step may include imparting, by the interleaving delay, a delay to the reference pulse. A step may include combining, by the second optical coupler, the signal pulse and the reference pulse to output the signal pulse and the interleaved reference pulse via a second fiber optic link to a wavelength division multiplexer (WDM). A step may include outputting, by a laser, a laser signal to an optical amplifier. A step may include amplifying, by the optical amplifier, the laser signal. A step may include combining, by the WDM, the interleaved signal and reference pulses with the laser signal to output the combination to a highly nonlinear fiber (HNLF), wherein the combination of the interleaved signal and reference pulses with the laser signal mix in the HNLF to produce an idler. A step may include filtering out, by an optical filter, the idler. A step may include separating, by an optical switch, the signal pulse and reference pulse. A step may include outputting, by the optical switch, the signal pulse on a first optical path, wherein the first optical path includes an optical delay. A step may include outputting, by the optical switch, the reference pulse on the second optical path. A step may include receiving, by a coherent detector, the signal pulse on the first optical path and the reference pulse on the second optical path, wherein the signal pulse and the reference pulse are time aligned when received by the coherent detector. A step may include determining, by the coherent detector, the RF signal by measuring the imprinted optical phase of the signal pulse.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
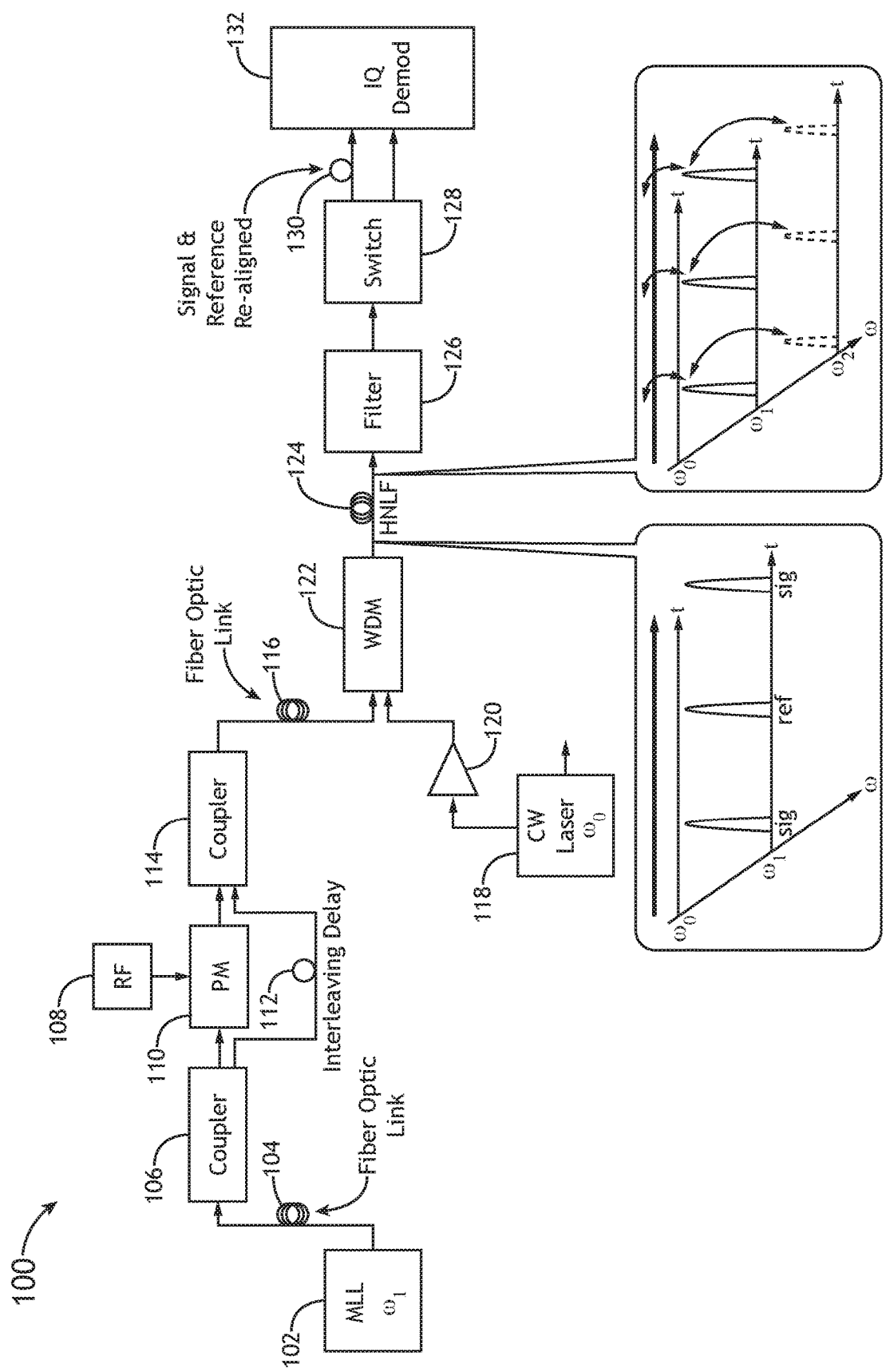
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and system configured to enhance optical phase sensitivity to reduce power requirements. Embodiments may use optical four wave mixing (FWM) in a highly nonlinear fiber (HNLF) to double the effective phase modulation depth. Both the signal and reference optical pulses can be time division multiplexed together, allowing both to translate to the same wavelength after phase doubling.

Performance parameters may include power requirements at remote and base locations, signal to noise ratio (SNR), spurious free dynamic range (SFDR), and system $V_\pi$ (e.g., amount of RF power required at the input to achieve a $\pi$ optical phase shift).

Referring now to FIG. 1, an exemplary embodiment of a system 100 according to the inventive concepts disclosed is depicted. The system may be implemented as a vehicle (e.g., an aircraft, a spacecraft, a submarine, a ship, an automobile, or a train) or a fixed location system (e.g., located on the ground including a base location and/or remote location).

The system 100 may include an optical pulse source (e.g., a mode locked laser 102 (MLL)), a fiber optic link 104, an optical coupler 106, an RF source 108, a phase modulator 110 (PM), an interleaving delay 112, an optical coupler 114, a fiber optic link 116, a continuous wave (CW) laser 118, an optical amplifier 120, a wavelength division multiplexer 122 (WDM), a highly nonlinear fiber 124 (HNLF), an optical filter 126, an optical switch 128, an optical delay 130, and a coherent detector 132, some or all of which may be coupled (e.g., electronically coupled and/or optically coupled (e.g., optically coupled by at least one optical line or cable)) at any given time.

The optical pulse source may be any suitable optical pulse source, such as the MLL 102. The optical pulse source may be a low jitter optical pulse source. The optical pulse source may be used to sample the RF signal from the RF source 108. The optical pulse source may be optically coupled to the optical coupler 106 (e.g., via the fiber optic link 104). The optical coupler may be configured to output pairs ($\omega_1$) of a signal pulse and a reference pulse. The optical coupler may be configured to split the pair of the signal pulse and the reference pulse along two paths, such that the reference pulse is sent through the interleaving delay 112 to the optical coupler 114 and such that the signal pulse is sent to the PM 110.

The fiber optic link 104 may be coupled between the MLL 102 and the optical coupler 106. The fiber optic link 104 can be used to transmit an optical pulse from the optical source 102 to a remote location.

The optical coupler 106 may be configured to split an optical pulse into two paths: 1) a first optical path for a signal pulse; and 2) a second optical path for a reference pulse. The optical coupler may be optically coupled to the MLL 102 (e.g., via the fiber optic link 104), the PM 110, and the interleaving delay 112.

Figure 2A:
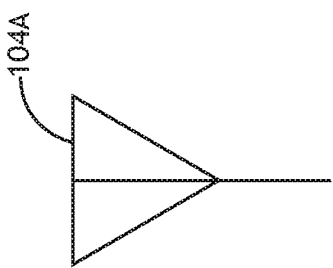
FIG. 2A is a view of an RF source of FIG. 1 implemented as an antenna according to the inventive concepts disclosed herein.
Figure 2B:
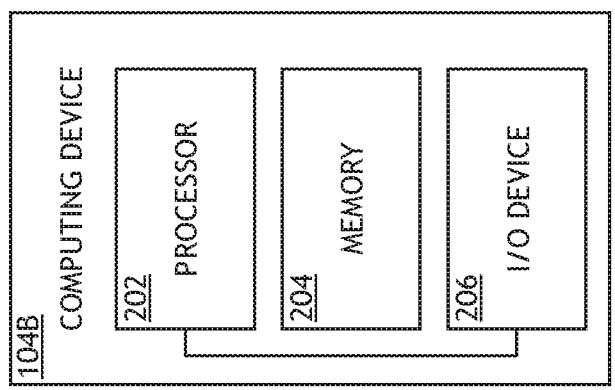
FIG. 2B is a view of an RF source of FIG. 1 implemented as computing device according to the inventive concepts disclosed herein.
Figure 2C:
FIG. 2C is a view of an RF source of FIG. 1 implemented as a receiver according to the inventive concepts disclosed herein.

The RF source 108 may be configured to provide a signal of interest to the PM 110. The RF source 108 may be electronically coupled to the PM 110. The RF source 108 may be implemented as any suitable RF source, such as a signal from an antenna 104A (as shown in FIG. 2A), a computing device 104B (as shown in FIG. 2B), and/or a receiver 104C (as shown in FIG. 2C). For example, the computing device 1046 may include a processor 202, memory 204, and an input/output device 206, some or all of which may be communicatively coupled at any given time. For example, the computing device 1046 may output a signal of interest indicative of a user input.

The PM 110 may be implemented as an electro-optical phase modulator. The PM 110 may be electronically coupled to the RF source 108. The PM 110 may be optically coupled to the optical pulse source (e.g., MLL 102) and the optical coupler 114. The PM 110 may be configured to imprint the RF signal of interest onto the optical phase of the signal pulse (from the optical pulse source, such as the MLL 102). The PM may output the imprinted signal pulse to the optical coupler 114.

The interleaving delay 112 may be optically coupled to the optical pulse source (e.g., MLL 102) and the optical coupler 114. The interleaving delay 112 may be configured to impart a delay (e.g., a half-period delay) to the reference pulse, allowing for time interleaving between the reference pulse and the imprinted signal pulse.

The optical coupler 114 may be configured to combine the imprinted signal pulse and the reference pulse onto a single optical fiber to output signal and reference interleaved pulses ($\omega_1$). The optical coupler 114 may be optically coupled to the PM 110, the interleaving delay 112, and the WDM 122 (e.g., via the fiber optic link 116).

The fiber optic link 116 may be coupled between the optical coupler 114 and the WDM 122. The fiber optic link 116 can be used to transmit the interleaved signal and reference pulses from a remote location back to a base location.

The CW laser 118 may output a laser signal ($\omega_0$) that may be a seed for a nonlinear four-wave mixing process. The CW laser 118 may be optically coupled to an optical amplifier 120.

The optical amplifier 120 may be optically coupled to the CW laser 118 and the WDM 122. The optical amplifier 120 may be configured to boost the optical power of the laser signal ($\omega_0$).

The WDM 122 may be configured to combine two signals at different wavelengths with low loss. The WDM here combines the signal and reference interleaved pulses ($\omega_1$) with the laser signal ($\omega_0$) onto a single fiber (e.g., the HNLF 124). The WDM may be optically coupled to the optical amplifier 120, the optical coupler 114 (e.g., via the fiber optic link 116), and the optical filter 126 (e.g., via the HNLF 124).

The HNLF 124 may be coupled between the WDM 122 and the optical filter 128. For example, the HNLF 124 may be implemented as a polarization maintaining HNLF (PM-HNLF). The HNLF 124 may be an optical fiber with a high $\chi^{(3)}$ coefficient, enabling efficient nonlinear effects such as four wave mixing. The signal and reference interleaved pulses ($\omega_1$) and the laser signal ($\omega_0$) may mix in the HNLF 124 to produce a new signal (called the idler) at $\omega_2$. The idler may be generated only when a signal or reference pulse is present. Due to the four wave mixing properties, the idler that is generated may possess twice the phase of the signal and reference pulses. This phase doubling is exploited to increase the effective phase modulation depth. PM-HNLF may be used in combination with a polarization maintaining system to increase the system stability and reduce overall system complexity.

The optical filter 126 may be optically coupled to the WDM 122 (e.g., via the HNLF 124) and the optical switch 128. The optical filter 126 may be configured to filter out (e.g., only filter out) the newly generated idler at $\omega_2$. The optical filter 126 may output the idler to the optical switch 128.

The optical switch 128 may be optically coupled to the optical filter 126 and the coherent detector 132 (e.g., via two optical paths). The optical switch 128 may be configured to separate the signal pulse and reference pulse into two optical paths: 1) a first optical path for the signal pulse; and 2) a second optical path for the reference pulse. The first path may include an optical delay 130 such that the signal pulse and the reference pulse are time aligned when the signal pulse and the reference pulse arrive at the coherent detector 132.

The coherent detector 132 (e.g., an IQ demodulator (in-phase and quadrature demodulator)) may be optically coupled to the optical switch 128 via the two optical paths. The coherent detector 132 may be configured to receive the time aligned signal pulse and reference pulse. The coherent detector 132 may be configured to determine the original modulated RF signal by measuring the imprinted phase on the signal pulse.

Referring now to FIGS. 3-7, graphs related to the performance of the system 100 are depicted. In a back-to-back (BTB) case, the HNLF 124, CW laser 118, the optical amplifier 120, and optical filter 126 were removed from the system 100 to measure the system 100 performance with no phase enhancement. In a phase sensitivity enhancement (PSE) case, the HNLF 124, CW laser 118, the optical amplifier 120, and optical filter 126 were included in the system 100.

Figure 3:
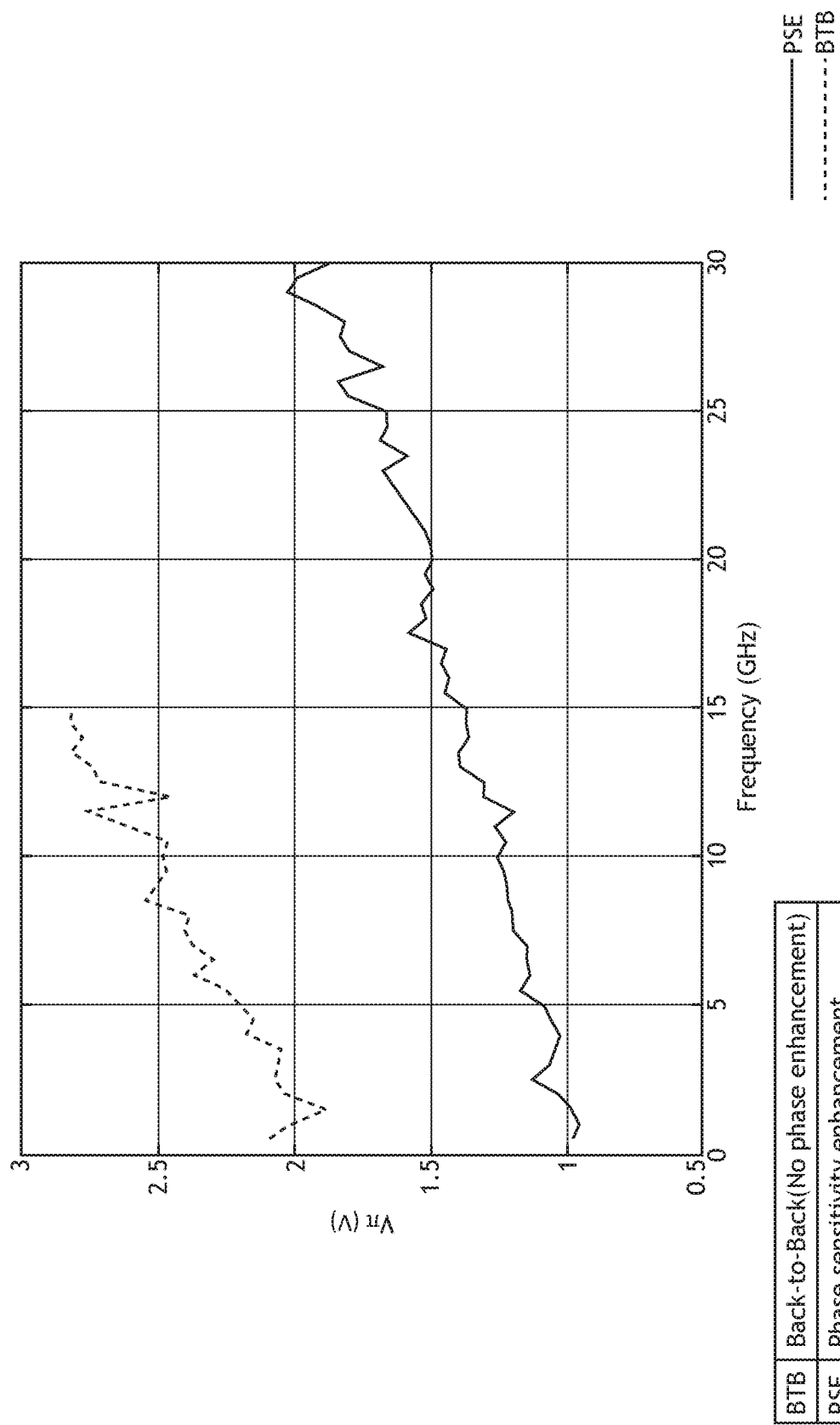
FIG. 3 is a graph of the amount of RF voltage needed to achieve a $\pi$-optical phase shift (V$\pi$) on the signal path according to the inventive concepts disclosed herein.

FIG. 3 shows the amount of RF voltage (Vπ) needed to achieve a π-optical phase shift on the signal path. The PSE method of this disclosure reduces Vπ by a factor of 2.

Figure 4:
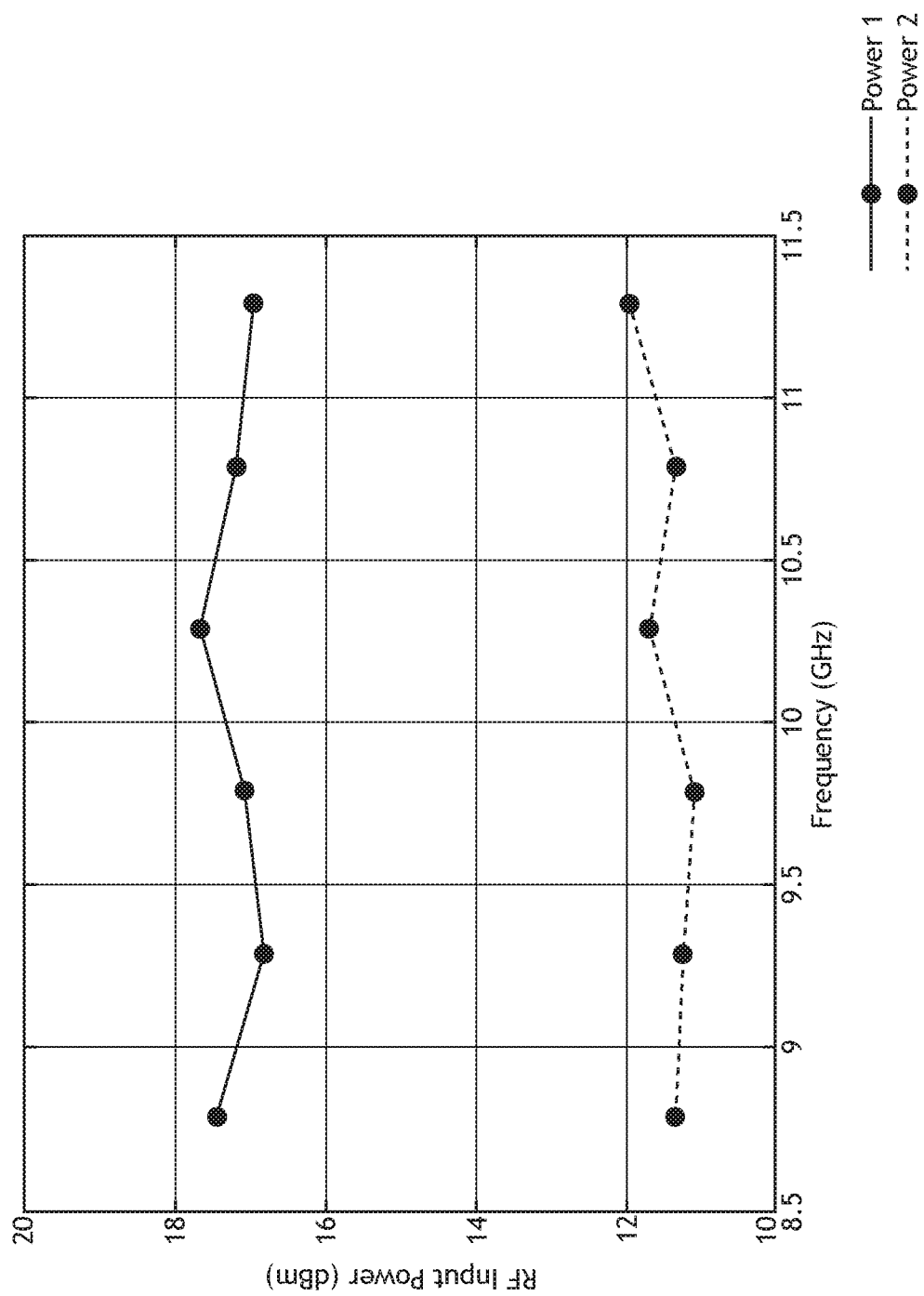
FIG. 4 is a graph of the amount of input RF power measured in dBm that was used at each frequency for two different cases according to the inventive concepts disclosed herein.

FIG. 4 shows the amount of input RF power measured in dBm that was used at each frequency for two different cases (power 1 and power 2).

Figure 5:
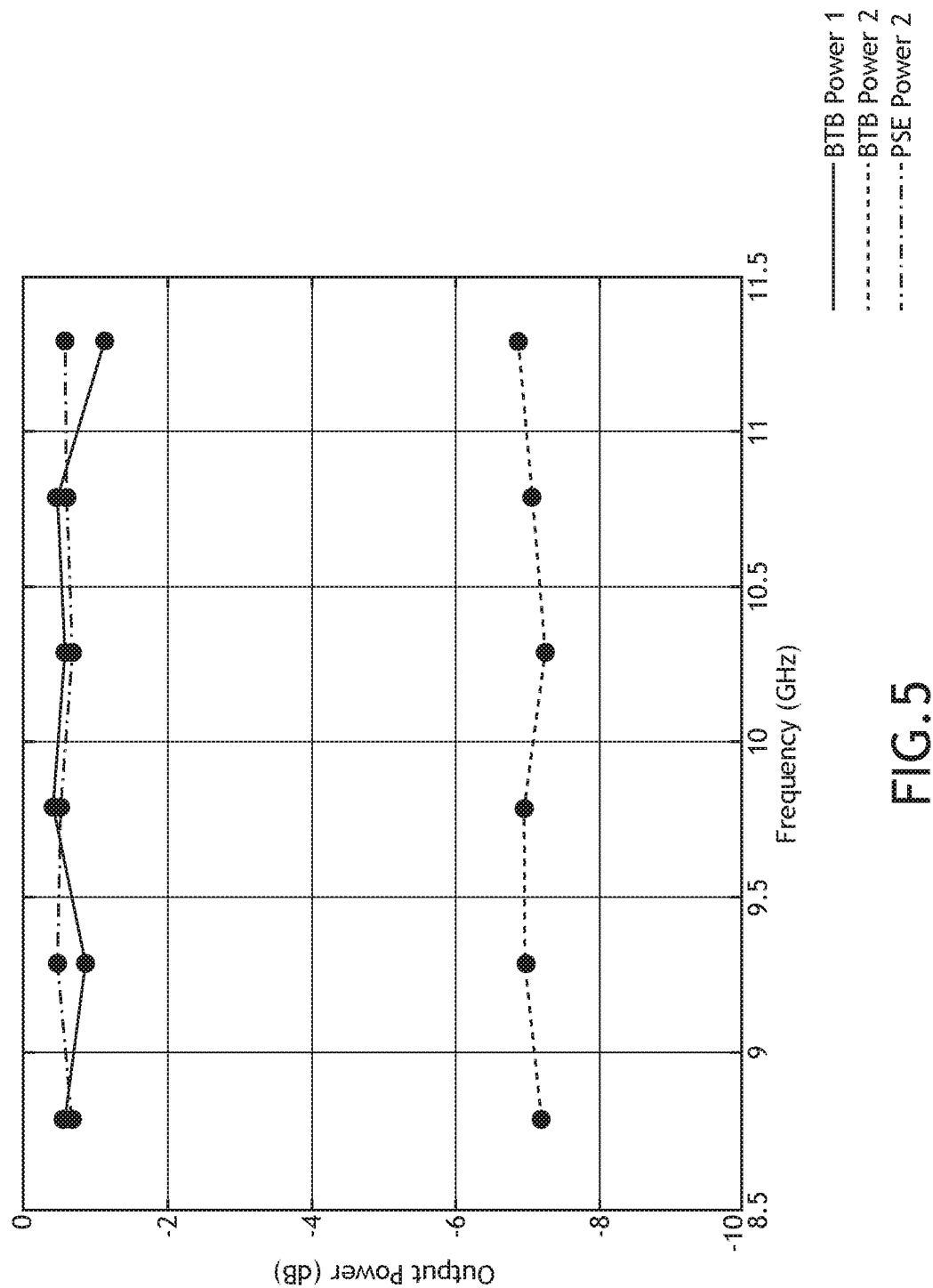
FIG. 5 is a graph of the output power at each frequency according to the inventive concepts disclosed herein.

FIG. 5 shows the measured RF output power at each frequency. Using the lower power input (power 2), the BTB case reduces output power by approximately 6 dB. However, using the PSE scheme with the lower power input (power 2), the output power increases by 6 dB yielding results very close to the higher powered (power 1) BTB case. As a result, PSE reaches the same output power with 6 dB lower input power than the BTB case (power 1).

Figure 6:
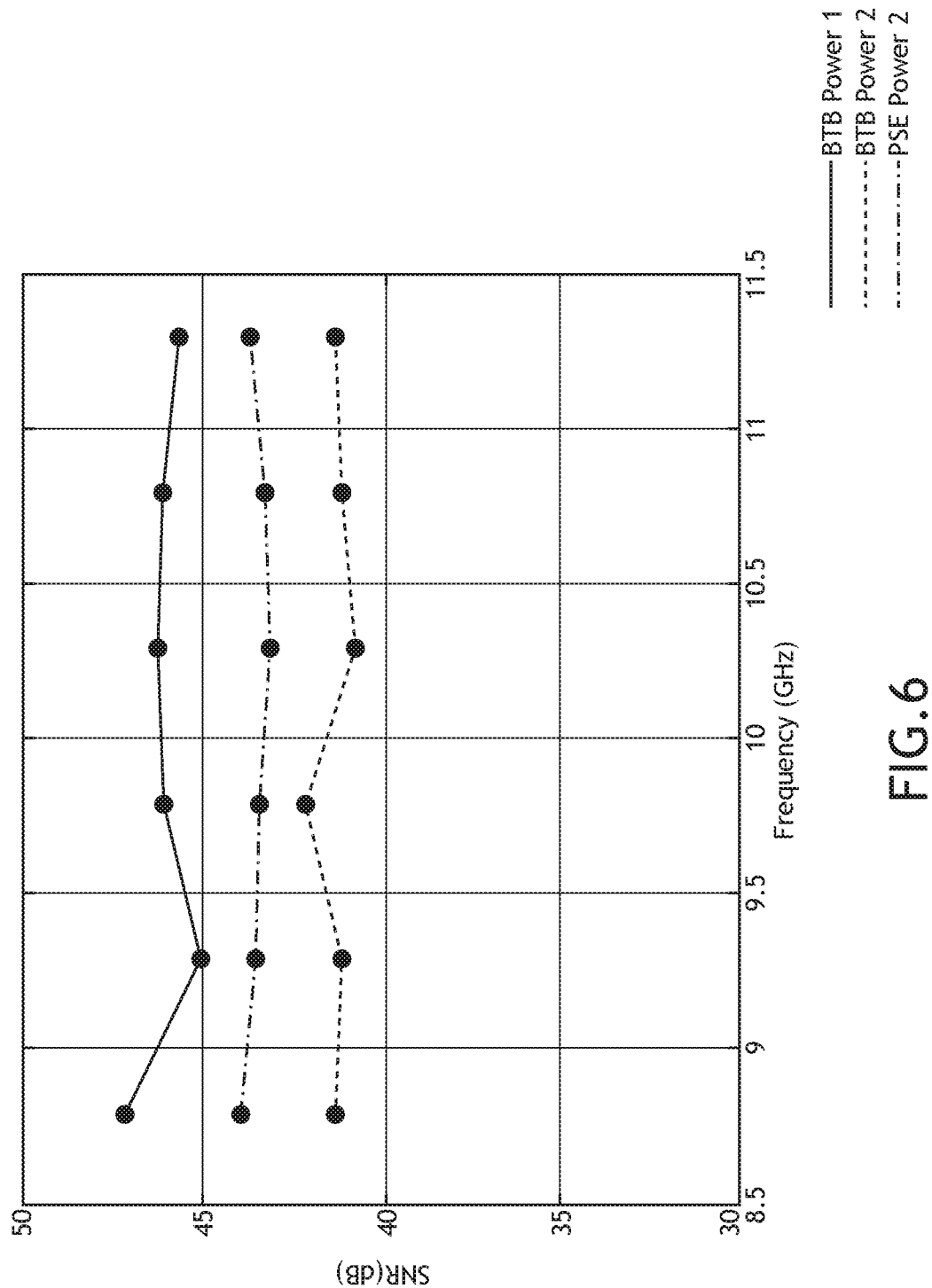
FIG. 6 is a graph of the signal to noise ratio (SNR) performance of the system of FIG. 1 according to the inventive concepts disclosed herein.

FIG. 6 shows the signal to noise ratio (SNR) performance of the system 100. PSE (power 2) performs with only 2.6 dB lower SNR than BTB (power 1), but with 6 dB lower input power.

Figure 7:
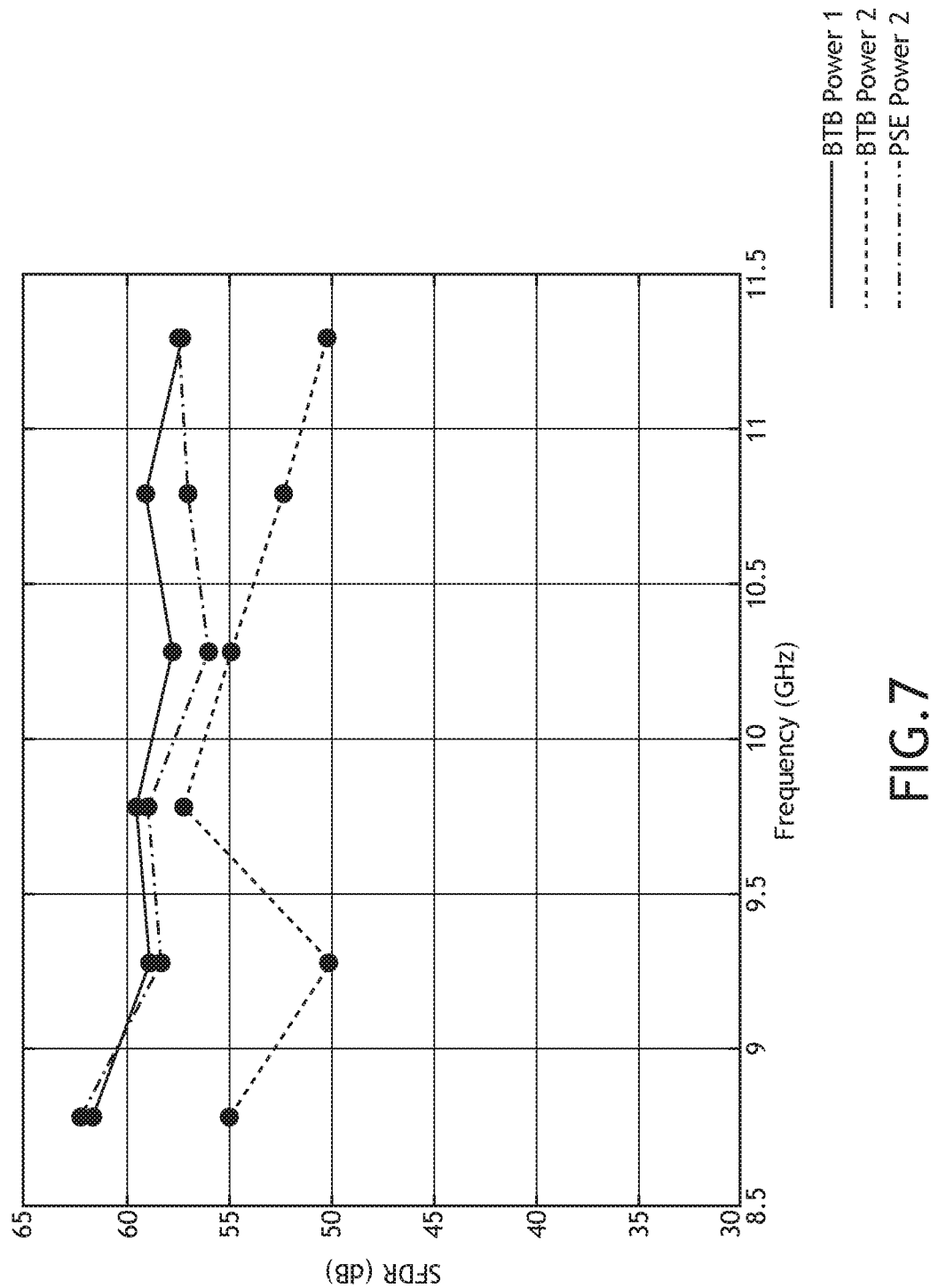
FIG. 7 is a graph of a measurement of the single tone spurious free dynamic range (SFDR) according to the inventive concepts disclosed herein.

FIG. 7 shows a measurement of the single tone spurious free dynamic range (SFDR). PSE (power 2) performs with similar SFDR as BTB (power 1) indicating that the 2.6 dB drop in SNR is due to increased noise. Optimizing the optical amplifiers in the system 100 may help reduce the noise in the system and allow for even higher performance.

Figure 8A:
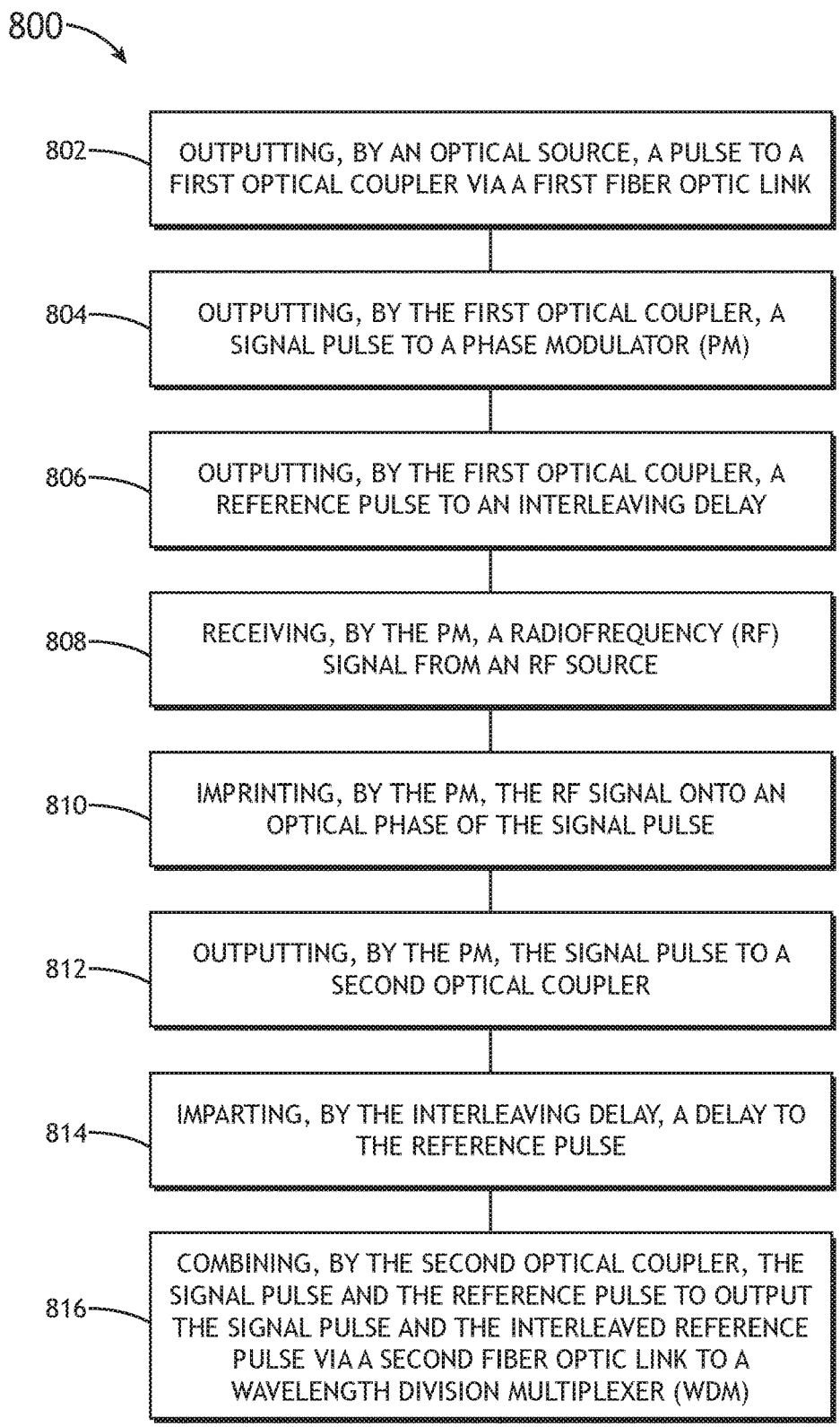
FIGS. 8A-B are diagrams of an exemplary embodiment of a method according to the inventive concepts disclosed herein.
Figure 8B:
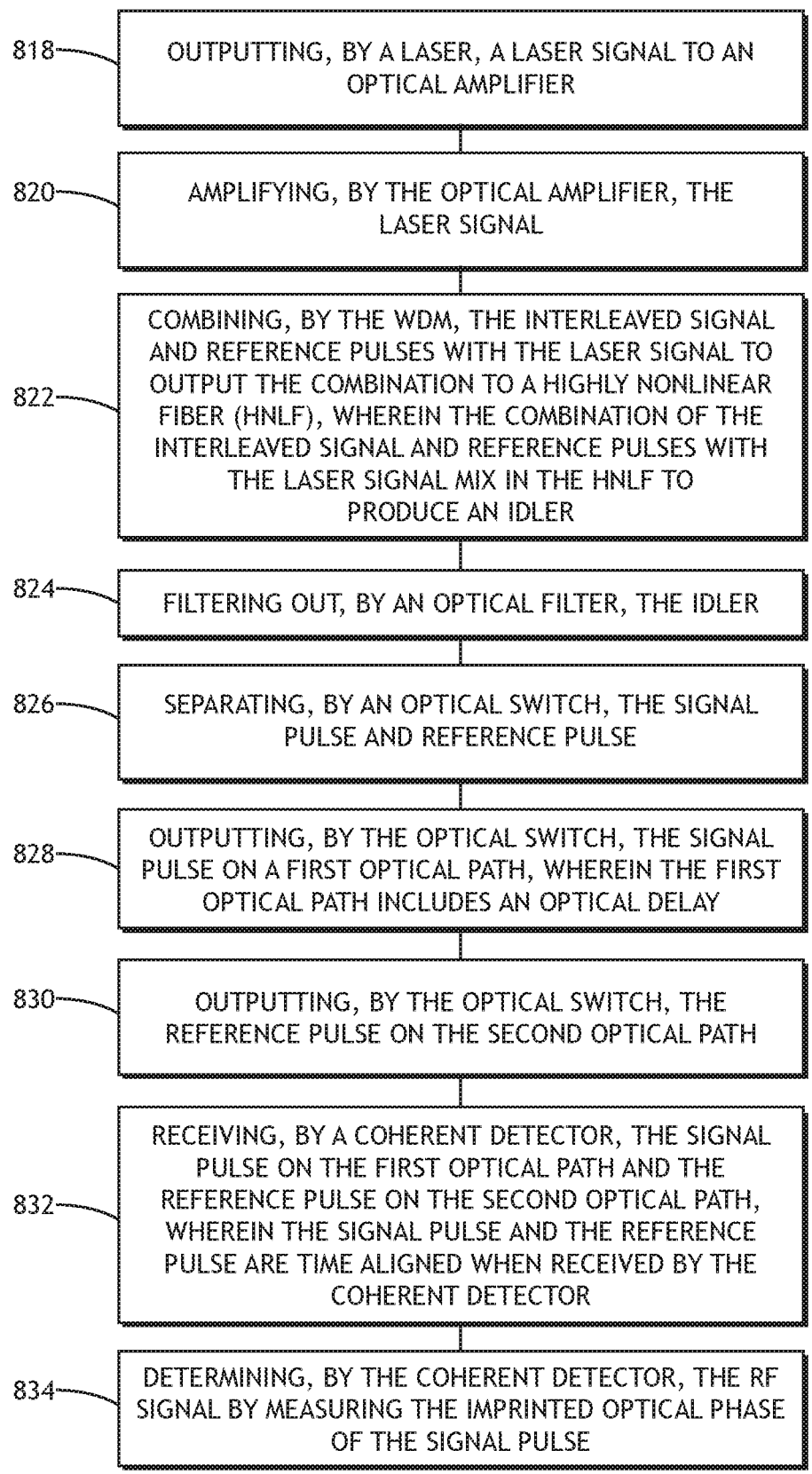

Referring now to FIGS. 8A-B, an exemplary embodiment of a method 800 according to the inventive concepts disclosed herein may include one or more of the following steps. Additionally, for example, some embodiments may include performing one more instances of the method 800 iteratively, concurrently, and/or sequentially. Additionally, for example, at least some of the steps of the method 800 may be performed in parallel, simultaneously, and/or concurrently. Additionally, in some embodiments, at least some of the steps of the method 800 may be performed non-sequentially.

A step 802 may include outputting, by an optical source, a pulse to a first optical coupler via a first fiber optic link.

A step 804 may include outputting, by the first optical coupler, a signal pulse to a phase modulator (PM).

A step 806 may include outputting, by the first optical coupler, a reference pulse to an interleaving delay.

A step 808 may include receiving, by the PM, a radiofrequency (RF) signal from an RF source.

A step 810 may include imprinting, by the PM, the RF signal onto an optical phase of the signal pulse.

A step 812 may include outputting, by the PM, the signal pulse to a second optical coupler.

A step 814 may include imparting, by the interleaving delay, a delay to the reference pulse.

A step 816 may include combining, by the second optical coupler, the signal pulse and the reference pulse to output the signal pulse and the interleaved reference pulse via a second fiber optic link to a wavelength division multiplexer (WDM).

A step 818 may include outputting, by a laser, a laser signal to an optical amplifier.

A step 820 may include amplifying, by the optical amplifier, the laser signal.

A step 822 may include combining, by the WDM, the interleaved signal and reference pulses with the laser signal to output the combination to a highly nonlinear fiber (HNLF), wherein the combination of the interleaved signal and reference pulses with the laser signal mix in the HNLF to produce an idler.

A step 824 may include filtering out, by an optical filter, the idler.

A step 826 may include separating, by an optical switch, the signal pulse and reference pulse.

A step 828 may include outputting, by the optical switch, the signal pulse on a first optical path, wherein the first optical path includes an optical delay.

A step 830 may include outputting, by the optical switch, the reference pulse on the second optical path.

A step 832 may include receiving, by a coherent detector, the signal pulse on the first optical path and the reference pulse on the second optical path, wherein the signal pulse and the reference pulse are time aligned when received by the coherent detector.

A step 834 may include determining, by the coherent detector, the RF signal by measuring the imprinted optical phase of the signal pulse.

Further, the method 800 may include any of the operations disclosed throughout.

As will be appreciated from the above, embodiments of the inventive concepts disclosed herein may be directed to a method and system configured to enhance optical phase sensitivity to reduce power requirements.

As used throughout and as would be appreciated by those skilled in the art, "at least one non-transitory computer-readable medium" may refer to as at least one non-transitory computer-readable medium (e.g., memory 204; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    an optical pulse source;
    a first fiber optic link;
    a first optical coupler optically coupled to the optical pulse source via the first fiber optic link;
    a radiofrequency (RF) source;
    a phase modulator (PM) optically coupled to the first optical coupler and electronically coupled to the RF source;
    an interleaving delay optically coupled to the first optical coupler;
    a second optical coupler optically coupled to the PM and the interleaving delay;
    a second fiber optic link;
    a laser;
    an optical amplifier optically coupled to the laser;
    a wavelength division multiplexer (WDM) optically coupled to the optical amplifier and the second optical coupler via the second fiber optic link;
    a highly nonlinear fiber (HNLF);
    an optical filter optically coupled to the WDM via the HNLF;
    an optical switch optically coupled to the optical filter; and
    a coherent detector optically coupled to the optical switch via a first optical path and a second optical path, the first optical path including an optical delay,
    wherein the optical pulse source is configured to output a pulse,
    wherein the pulse is transmitted, via the first fiber optic link, from the optical pulse source to the first optical coupler,
    wherein the first optical coupler is configured to split the pulse into a signal pulse to the PM and a reference pulse to the interleaving delay,
    wherein the PM is configured to receive an RF signal from the RF source, to imprint the RF signal onto an optical phase of the signal pulse, and to output the signal pulse to the second optical coupler,
    wherein the interleaving delay is configured to impart a delay to the reference pulse,
    wherein the second optical coupler is configured to combine the signal pulse and the interleaved reference pulse to output the signal pulse and the interleaved reference pulse,
    wherein the signal pulse and the interleaved reference pulse is transmitted, via the second fiber optic link,
    wherein the laser is configured to output a laser signal to the optical amplifier,
    wherein the optical amplifier is configured to amplify the laser signal,
    wherein the WDM is configured to combine the signal and interleaved reference pulses with the laser signal and to output the combination to the HNLF,
    wherein the combination of the signal and interleaved reference pulses with the laser signal mix in the HNLF to produce an idler,
    wherein the optical filter is configured to filter out the idler,
    wherein the optical switch is configured to separate the signal pulse and reference pulse, output the signal pulse on the first optical path, and output the reference pulse on the second optical path,
    wherein the signal pulse and reference pulse are time aligned when received by the coherent detector,
    wherein the coherent detector is configured to determine the RF signal by measuring the imprinted optical phase of the signal pulse.

2. The system of claim 1, wherein the optical pulse source is a mode locked laser (MLL).

3. The system of claim 1, wherein the RF source is an antenna.

4. The system of claim 1, wherein the RF source is a computing device.

5. The system of claim 1, wherein the RF source is a receiver.

6. The system of claim 1, wherein the PM is an electro-optical PM.

7. The system of claim 1, wherein the laser is a continuous wave (CW) laser.

8. The system of claim 1, wherein the HNLF is a polarization maintaining HNLF (PM-HNLF).

9. The system of claim 1, wherein the idler has twice the phase of the signal pulse and the reference pulse.

10. The system of claim 1, wherein the system is a vehicle.

11. The system of claim 10, wherein the vehicle is an aircraft.

12. The system of claim 1, wherein the system is implemented as a fixed location system.

13. An aircraft system, comprising:
an optical pulse source;
a first fiber optic link;
a first optical coupler optically coupled to the optical pulse source via the first fiber optic link;
a radiofrequency (RF) source;
a phase modulator (PM) optically coupled to the first optical coupler and electronically coupled to the RF source;
an interleaving delay optically coupled to the first optical coupler;
a second optical coupler optically coupled to the PM and the interleaving delay;
a second fiber optic link;
a laser;
an optical amplifier optically coupled to the laser;
a wavelength division multiplexer (WDM) optically coupled to the optical amplifier and the second optical coupler via the second fiber optic link;
a highly nonlinear fiber (HNLF);
an optical filter optically coupled to the WDM via the HNLF;
an optical switch optically coupled to the optical filter; and
a coherent detector optically coupled to the optical switch via a first optical path and a second optical path, the first optical path including an optical delay,
wherein the optical pulse source is configured to output a pulse,
wherein the pulse is transmitted, via the first fiber optic link, from the optical pulse source to the first optical coupler,
wherein the first optical coupler is configured to split the pulse into a signal pulse to the PM and a reference pulse to the interleaving delay,
wherein the PM is configured to receive an RF signal from the RF source, to imprint the RF signal onto an optical phase of the signal pulse, and to output the signal pulse to the second optical coupler,
wherein the interleaving delay is configured to impart a delay to the reference pulse,
wherein the second optical coupler is configured to combine the signal pulse and the interleaved reference pulse to output the signal pulse and the interleaved reference pulse,
wherein the signal pulse and the interleaved reference pulse is transmitted, via the second fiber optic link,
wherein the laser is configured to output a laser signal to the optical amplifier,
wherein the optical amplifier is configured to amplify the laser signal,
wherein the WDM is configured to combine the signal and interleaved reference pulses with the laser signal and to output the combination to the HNLF,
wherein the combination of the signal and interleaved reference pulses with the laser signal mix in the HNLF to produce an idler,
wherein the optical filter is configured to filter out the idler,
wherein the optical switch is configured to separate the signal pulse and reference pulse, output the signal pulse on the first optical path, and output the reference pulse on the second optical path,
wherein the signal pulse and reference pulse are time aligned when received by the coherent detector,
wherein the coherent detector is configured to determine the RF signal by measuring the imprinted optical phase of the signal pulse.

14. The aircraft system of claim 13, wherein the optical pulse source is a mode locked laser (MLL).

15. The aircraft system of claim 13, wherein the RF source is an antenna.

16. The aircraft system of claim 13, wherein the RF source is a receiver.

17. The aircraft system of claim 13, wherein the laser is a continuous wave (CW) laser.

18. The aircraft system of claim 13, wherein the HNLF is a polarization maintaining HNLF (PM-HNLF).

19. The aircraft system of claim 13, wherein the idler has twice the phase of the signal pulse and the reference pulse.

20. A method, comprising:
outputting, by an optical source, a pulse to a first optical coupler via a first fiber optic link;
outputting, by the first optical coupler, a signal pulse to a phase modulator (PM);
outputting, by the first optical coupler, a reference pulse to an interleaving delay;
receiving, by the PM, a radiofrequency (RF) signal from an RF source;
imprinting, by the PM, the RF signal onto an optical phase of the signal pulse;
outputting, by the PM, the signal pulse to a second optical coupler;
imparting, by the interleaving delay, a delay to the reference pulse;
combining, by the second optical coupler, the signal pulse and the interleaved reference pulse to output the signal pulse and the interleaved reference pulse via a second fiber optic link to a wavelength division multiplexer (WDM);
outputting, by a laser, a laser signal to an optical amplifier;
amplifying, by the optical amplifier, the laser signal;
combining, by the WDM, the signal and interleaved reference pulses with the laser signal to output the combination to a highly nonlinear fiber (HNLF), wherein the combination of the signal and interleaved reference pulses with the laser signal mix in the HNLF to produce an idler;
filtering out, by an optical filter, the idler;
separating, by an optical switch, the signal pulse and reference pulse;
outputting, by the optical switch, the signal pulse on a first optical path, wherein the first optical path includes an optical delay;
outputting, by the optical switch, the reference pulse on a second optical path;
receiving, by a coherent detector, the signal pulse on the first optical path and the reference pulse on the second optical path, wherein the signal pulse and the reference pulse are time aligned when received by the coherent detector; and
determining, by the coherent detector, the RF signal by measuring the imprinted optical phase of the signal pulse.

\* \* \* \* \*